Patented July 30, 1940

2,209,746

UNITED STATES PATENT OFFICE 2,209,746

PROCESS OF POLYMERIZING BUTADIENES

Georg Ebert, Reinhard Heidebroek, and Philipp Orth, Ludwigshafen-on-the-Rhine, Germany, assignors, by mesne assignments, to Jasco, Incorporated, a corporation of Louisiana No Drawing. Application September 27, 1938, Serial No. 232,006. In Germany October 1, 1937

3 Claims. (Cl. 260—93)

The present invention relates to an improved process of polymerizing butadienes.

In the known polymerization of butadiene, its homologues and analogues in a block, i. e. in a coherent mass, by means of alkali metals, various difficulties are encountered in carrying it out on a large scale. Thus it is very difficult to lead away uniformly the heat of polymerization and to keep the polymerization temperatures at the same height; this is, however, essential for the production of uniform polymerization products. The polymerization further requires a more or less prolonged initiation period which depends inter alia on the purity of the hydrocarbons used. As soon as the polymerization has started, it proceeds at first very vigorously but then gradually falls off. For a complete and thorough polymerization it is then necessary for the reaction mixture to remain for a long period in the polymerization vessel. The withdrawal of the polymerization products from the vessels used must be carried out with great care because the sodium used as catalysts readily ignites or an ignition may also take place by the occurrence of electric discharges. In the case of potassium it is practically impossible to carry out the polymerization on a large scale according to the prior processes because it proceeds so vigorously that a simultaneous withdrawal of the heat formed is impossible. Moreover the polymerization products prepared with potassium ignite upon contact with the air very much more readily than do the products prepared with sodium.

We have now found that the said difficulties can be avoided and that butadienes, i. e. butadiene, its homologues and analogues, alone or in admixture with each other or with other polymerizable compounds, as for example styrene or vinylnaphthalene, can be polymerized in a manner which is especially simple and advantageous industrially with alkali metals or their mixtures or alloys, by carrying out the polymerization in tubes in which the material to be polymerized is moved forward during the course of the polymerization while being mixed thoroughly and from which the polymerization product is withdrawn at the end.

It has been found to be specially advantageous to use as the device for effecting the forward movement of the material to be polymerized a conveyor worm which, naturally, must be made sufficiently strong to move also the already polymerized material and to force it out from the end of the tube. In this way relatively small polymerization chambers may be used from which the heat occurring may be readily led away, so that the temperature is always kept at the same height.

It is specially advantageous to use the alkali metal in a very finely divided form, advantageously in the form of pastes with viscous substances which are inert to the alkali metal. Among substances which are inert to alkali metals and which are capable of keeping the finely divided alkali metal uniformly in suspension there may be mentioned for example soft paraffin wax or butadiene of a low degree of polymerization, as for example that having a proper viscosity of from 32 to 40, and also polyisobutylene. Such pastes may be prepared for example by heating fused alkali metal in the fused binding agent, stirring very vigorously and then cooling. The pastes may be handled entirely without danger and they do not burn in contact with water even when they contain up to 20 per cent of alkali metal. The alkali metal may have a grain size of up to $1/100$ millimeter.

When using the said pastes, the alkali metal may be distributed extremely uniformly in the material to be polymerized and, by reason of its large surface, it can exert a specially strong polymerizing action. If such pastes be used in the polymerization of butadiene in large pressure vessels, such as have hitherto been used in industry, the pastes, by reason of their high polymerizing power, frequently become coated with a layer of polymerization product before they have dissolved and become uniformly distributed, so that they become inactive. If care be taken, however, for a rapid dissolution and uniform dispersion of the pastes, for example by stirring, the polymerization proceeds so turbulently that it is impossible to lead away the heat of polymerization at the necessary speed and it is therefore impossible to carry out a regulated polymerization. For use with the tubes according to this invention, on the contrary, the said highly active form of the alkali metal is of special advantage and the polymerizations may be carried out entirely without danger by reason of the uniform, strong withdrawal of heat. The supply of the pastes is preferably effected through a cylinder provided with a piston and attached to the polymerization tube. The piston may be moved forward mechanically or hydraulically.

According to this invention the polymerization sets in considerably more rapidly than in the known methods and also proceeds at a much greater speed. The process proceeds continuously because the polymerization product is withdrawn at one end of the tube at a rate proportional to that at which the monomeric hydrocarbon is supplied to the other end. In the zone of the tube in which the polymerization is already completed, the free alkali metal still present may be destroyed in a manner entirely free from danger by the introduction of suitable substances, as for example alcohols, fatty acids or water, any ignition of the effluent polymerization product in the air being thus avoided. The polymerization may also be interrupted by additions of the said kind. Before or after the polymerization, there may also be added agents protecting against ageing, softening agents, fillers or the like so that there leaves the apparatus a product ready for use.

According to this invention the yields per unit of time and space are increased in quite an extraordinary degree, up to about 100 times, as compared with the known methods of polymerizing butadiene, its homologues and analogues by means of sodium. Contrary to expectation, polymerization products are obtained having still better properties than those obtained by the known methods.

The process also renders possible for the first time the polymerization with the use of potassium or its alloys on a large scale.

The following examples will further illustrate how this invention may be carried out in practice but the invention is not restricted to these examples.

Example 1

A tube having a length of 340 centimeters and a diameter of 10 centimeters, in which a worm having widenings of 6 centimeters in width and 3 centimeters in depth is turning at the rate of 12 turns per minute is used for the polymerization of butadiene.

The tube is provided with a jacket through which water may be caused to flow for the purpose of heating or cooling. Pressure gauges are provided at intervals of about 80 centimeters to control the pressure and consequently the progress of the polymerization. The tube holds about 10 kilograms of butadiene. At its inlet end there is provided a device for introducing sodium. At the outlet end there is provided a valve through which the finished polymerization product may be pressed out at the desired speed. When setting the polymerization in operation, the tube is first filled with butadiene, to which known regulating substances may be added, and the amount of sodium necessary for the polymerization is pressed continuously through the introduction device. After a few hours the finished polymerization product may be continuously tapped off through the outlet valve. For continuous operation, the tube must be supplied with fresh butadiene and alkali metal.

In the preparation of a polymeric butadiene having a proper viscosity of 40, 2 kilograms of polymerization product may thus be tapped off per hour; this contains less than 2 per cent of monomeric butadiene; the said results are obtained when carrying out the polymerization at from about 65° to 70° C. while using 0.2 per cent of sodium as polymerizing agent.

Under the same conditions, the content of non-polymerized butadiene is about 4 per cent or less when 3.2 kilograms of polymeric butadiene are tapped off per hour.

In the same way, polymerization products having a proper viscosity of 66 may be prepared. Such a polymerization product, after vulcanization, has a strength of 140 kilograms per square centimeter and an elasticity of 33, while a polymerization product of the same proper viscosity which has been prepared in a large batch in known manner in a rotary autoclave has a strength of only 80 kilograms per square centimeter and an elasticity of 26.

The preparation of polymerization products having still higher proper viscosities may also be carried out in a corresponding manner without difficulty provided the conveyor device in the tube is appropriately constructed.

Example 2

A 10 per cent alkali metal paste which has been prepared by vigorous stirring of an alloy of 4 parts of potassium and 1 part of sodium in polymerized butadiene having a proper viscosity of 32 at 120° C. is slowly pressed into the continuously operating polymerization apparatus described in Example 1. The conveyor worm in the polymerization apparatus effects a rapid dissolution of the paste and a uniform distribution of the alkali metal in the material to be polymerized. The polymerization therefore sets in very rapidly and uniformly. The difficulties, such as clogging of the fine nozzles, irregular distribution and the like, often encountered in the supplying of solid alkali metal, for example through nozzles, do not occur. The polymerization products obtained are of excellent quality.

What we claim is:

1. A method of continuously polymerizing a butadiene in the presence of an alkali metal as a polymerization catalyst which comprises introducing the material to be polymerized and the catalyst into a tube provided with a conveyor worm, polymerizing the material therein while thoroughly mixing it with the catalyst during forward movement through the conveyor, and withdrawing the finished product at the end of the tube.

2. A method in accordance with claim 1 in which the catalyst is a paste containing an alkali metal and a viscous organic substance inert to alkali metals.

3. A method in accordance with claim 1 in which the material to be polymerized is admixed with another polymerizable compound.

GEORG EBERT.
REINHARD HEIDEBROEK.
PHILIPP ORTH.